(12) United States Patent
Todate et al.

(10) Patent No.: US 6,269,279 B1
(45) Date of Patent: *Jul. 31, 2001

(54) CONTROL SYSTEM

(75) Inventors: Shigenori Todate; Katsuhiko Matsuda; Kazuhisa Nakama, all of Tokyo (JP)

(73) Assignee: Tokyo Electron Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/102,009

(22) Filed: Jun. 22, 1998

(30) Foreign Application Priority Data

Jun. 20, 1997 (JP) .................................................. 9-164287
Jun. 20, 1997 (JP) .................................................. 9-164288
Jun. 16, 1998 (JP) ................................................ 10-168160

(51) Int. Cl.⁷ .............................................. G06F 19/00
(52) U.S. Cl. ........................... 700/121; 700/108; 700/110
(58) Field of Search ............................. 700/95, 108, 110, 700/120, 121

(56) References Cited

U.S. PATENT DOCUMENTS

| 5,591,299 | * | 1/1997 | Seaton et al. | 364/468.28 |
| 5,778,386 | * | 7/1998 | Lin et al. | 707/200.1 |
| 5,859,964 | * | 1/1999 | Wang et al. | 395/185.01 |
| 5,889,674 | * | 3/1999 | Burdick et al. | 364/468.28 |
| 6,000,830 | * | 12/1999 | Asano et al. | 364/468.28 |

FOREIGN PATENT DOCUMENTS

| 5-74671 | 3/1993 | (JP) . |
| 6-291004 | 10/1994 | (JP) . |

* cited by examiner

*Primary Examiner*—Dennis M. Butler
(74) *Attorney, Agent, or Firm*—Oblon, Spivak, McClelland, Maier & Neustadt, P.C.

(57) ABSTRACT

A control system structured by a plurality of controller units for individually controlling a plurality of processing units for performing predetermined processes to a substrate, and a control unit including a server unit having a memory for reading and storing the process data generated by each control unit and a client unit having an editing section for reading the stored process data from the server unit and editing this process data and a display section for displaying the edited data.

18 Claims, 6 Drawing Sheets

CONTROL SYSTEM

BACKGROUND OF THE INVENTION

1. Field of the Invention

The present invention relates to a control system for controlling manufacturing equipment such as equipment for manufacturing semiconductor devices and equipment for manufacturing liquid crystal panels, for example, and relates more particularly to a control system having a function for integrally managing a plurality of substrate processing units.

2. Discussion of the Background

In recent years, along with large-scaled systems for processing semiconductor wafers and liquid crystal panels, there has been an increasing demand for integrally managing a number of manufacturing units for performing various types of processing to substrates, such as a CVD processing, a sputtering processing, an etching processing, a thermal oxide processing, etc.

According to a conventional control system having a function for integrally managing a plurality of processing units, the processing units for performing various processing to a substrate are controlled individually by an ECC (Equipment Controller Concept) controller. The ECC controller has an HCI (Host Communication Interface) as a logical interface with a host computer, and various data transactions with the host computer are carried out through a data transmission system such as TCP/IP or the like by this HCI. The host computer performs a tracking processing of various processing units through various data transactions with the ECC controller of each processing unit, stores process data received from each processing unit as hysteresis in a data base, stores this content in a monitor, and performs correction of various parameters and detection of abnormal conditions of the processing units based on this data base.

At the time of a process data transfer from the ECC controller of each processing unit to the host computer, the HCI selects only one part of minimum required data for the tracking processing, parameter correction and abnormality detection from the whole process data generated by the ECC controller, and then transmits this selected data to the host computer.

According to the integral management system based on this control system, however, the process data stored in the host computer is limited and information obtainable from the process data displayed in the monitor as a status of various processing units is also limited. Further, in many cases, changes of process data reflecting secular deterioration status of characteristics of the processing units cannot be detected by simply referring to the process data displayed in the monitor. Under these circumstances, it has been practically difficult to detect securely and at an early stage abnormalities and characteristic deterioration of the processing units.

SUMMARY OF THE INVENTION

It is an object of the present invention to provide a control system capable of contributing to an early detection of abnormalities and characteristic deterioration of processing units by achieving an integrated monitoring of detailed process data.

Further, it is another object of the present invention to provide a control system capable of improving maintainability by managing a plurality of processing units in detail and in integral.

Further, it is still another object of the present invention to provide a control system capable of contributing to an early detection of abnormalities and characteristic deterioration of processing units by managing a number of processing units in integral and detail from results of analysis of the process data.

Further, it is still another object of the present invention to provide a control system for achieving an automatic optimization of process conditions of each processing unit.

The present invention provides a control system comprising: a plurality of controller units for individually controlling a plurality of processing units for carrying out predetermined processes to a substrate; and a control unit including a server unit having a storage for fetching and storing process data generated by each control unit, and a client unit having an editor section for fetching the stored process data from the server unit and editing the process data and a display section for displaying the edited data obtained by the editor section.

In the present invention, the server unit of the control unit stores the process data read from each control unit. The client unit reads the process data stored in the server unit, converts this data into data of a format usable in own client unit and displays this data. The process data stored in the server unit are the process data of each processing unit, and this system enables an integrated monitoring of further detailed process data as compared with a conventional system for integrally monitoring the process data on a host computer. This system also enables an early detection of abnormalities and characteristic deterioration of the processing units. Further, since the hardware of the control unit for collecting and displaying the process data is divided into the server unit and the client unit so as to disperse the control load for the collection and display of the process data, it becomes possible to increase the number of processing units that can be connected.

Further, the present invention provides a control system, comprising: a plurality of controller units for individually controlling a plurality of processing units for carrying out predetermined processes to a substrate in association with a host computer; and a control unit having a plurality of server units provided corresponding to each predetermined group of the processing units and each having a memory for fetching and storing the process data generated by each controller unit, and a client unit having an editor section for reading stored process data from the server unit and editing the process data and a display section for displaying the edited data.

Further, the present invention provides a control system, comprising: a plurality of controller units for individually controlling a plurality of processing units for carrying out predetermined processes to a substrate; a host computer for controlling each controller unit based on a part of process data generated by each controller unit; and a control unit having a plurality of server units each provided corresponding to a group of processing units for which the same process conditions are set and having a storage for fetching and storing the process data generated by each control unit, and a client unit having an editor section for fetching the stored process data from the server unit and editing the process data and a display section for displaying the edited data.

According to the present invention, since a server for storing process data is provided for each predetermined group of processing units, for example, for each processing unit to which the same process conditions are set, the number of connectable processing units can be increased further, and it becomes not necessary to stop the operation of groups of processing units under management of other servers when updating the version of the functions of individual server units or when carrying out a maintenance inspection.

The present invention provides a control system, comprising: a plurality of controller units for individually controlling a plurality of processing units for carrying out predetermined processes to a substrate; a host computer for controlling each control unit based on process data received from each control unit; and a control unit for collecting process data received from each control unit, analyzing the collected process data and outputting a result of the analysis, wherein each control unit has a section for generating process data, a section for transmitting a part of process data preset from among the generated process data to the host computer, and a section for transmitting the process data generated to the control unit.

In other words, according to the present invention, as the control unit analyzes the process data generated by the control unit of each processing unit and outputs a result of this analysis, a range of information obtainable as a status of each processing unit can be expanded and secular changes of the status of each processing unit can be detected at an early stage as compared with the conventional system for integrally monitoring a part of process data on the computer.

Further, the present invention provides a control system, comprising: a plurality of controller units for individually controlling a plurality of processing units for carrying out predetermined processes to a substrate; a host computer for controlling each control unit based on process data received from each control unit; and a control unit for collecting process data received from each control unit, analyzing the collected process data and updating process conditions of each processing unit based on a result of the analysis, wherein each control unit has a section for generating process data, a section for transmitting a part of process data preset from among the generated process data to the host computer, and a section for transmitting all the process data generated to the control unit.

In the present invention, as the section for updating the process conditions based on a result of analysis of the process data generated in each control unit is further provided, it becomes possible to automatically obtain process conditions optimum from various viewpoints taking secular changes of the characteristics of each processing unit into consideration, and it also becomes unnecessary to carry out artificial trials and errors for setting the process conditions.

Further, the present invention provides a control system, comprising: a plurality of controller units for individually controlling a plurality of processing units for carrying out predetermined processes to a substrate; a host computer for controlling each control unit based on process data received from each control unit; and a control unit for collecting process data received from each control unit, analyzing the collected process data, outputting a result of the analysis and compensating the process data dropped during a period while the host computer is not able to receive the process with the collected process data, wherein each control unit has a section for generating process data, a section for transmitting a part of process data preset from among the generated process data to the host computer, and a section for transmitting all the process data generated to the control unit.

In the present invention, as the section for compensating the process data dropped during a period while the host computer is not able to receive the process data with the collected process data is further provided, the host computer can start immediately again the control of the control unit for each processing unit immediately after the recovery from a down status.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Referring now to the drawings, wherein like reference numerals designate identical or corresponding parts throughout the several views, and more particularly to FIGS. 1–6 thereof, there are illustrated various exemplary embodiments of the present invention, as will now be described in detail.

A control system relating to the present invention is applied to the following combined-process type equipment for processing semiconductor wafers or the like, for example.

Figure 1:
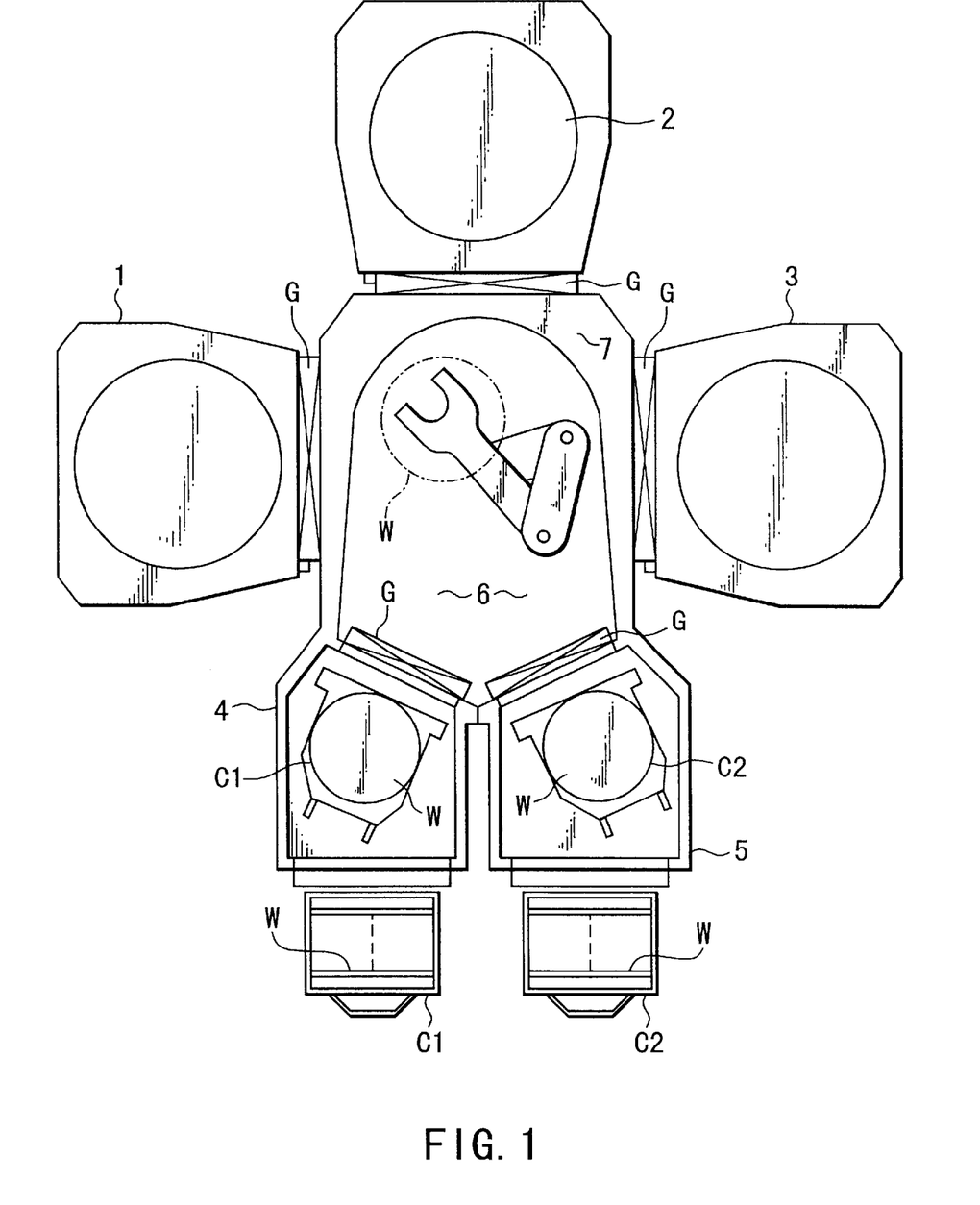
FIG. 1 is a schematic configuration diagram of combined-process type equipment for processing semiconductor wafers to be controlled by a control system relating to the present invention.

As shown in FIG. 1, the equipment for processing semiconductor wafers is structured to include a plurality of, for example, three process chambers 1, 2 and 3 for performing various types of processing to semiconductor wafers, such as, for example, a CVD processing, a sputtering processing, an etching processing or a thermal oxide processing, cassette chambers 4 and 5 for accommodating cassettes C1 and C2 capable of accommodating, for example, 25 wafers W, and a transfer chamber 6 for delivering wafers W between the process chambers 1, 2 and 3 and the cassette chambers 4 and 5. Each chamber is connected to other chambers through a gate valve G in open or closed state. Within the transfer chamber 6, there is provided, for example, a multi-joint type transfer arm 7 capable of performing a bending operation and a rotation operation. The wafers W are transferred between the chambers by this transfer arm 7. The cassettes C1 and C2 are inversely rotated by 90 degrees when these cassettes are taken into the cassette chambers 4 and 5 respectively, and the rotation is done so that a wafer insertion and extraction opening of the cassettes C1 and C2 faces the center within the transfer chamber 6. Thus, the cassettes C1 and C2 are set in a posture to permit entering and retrieving of the wafers W by the transfer arm 7.

Figure 2:
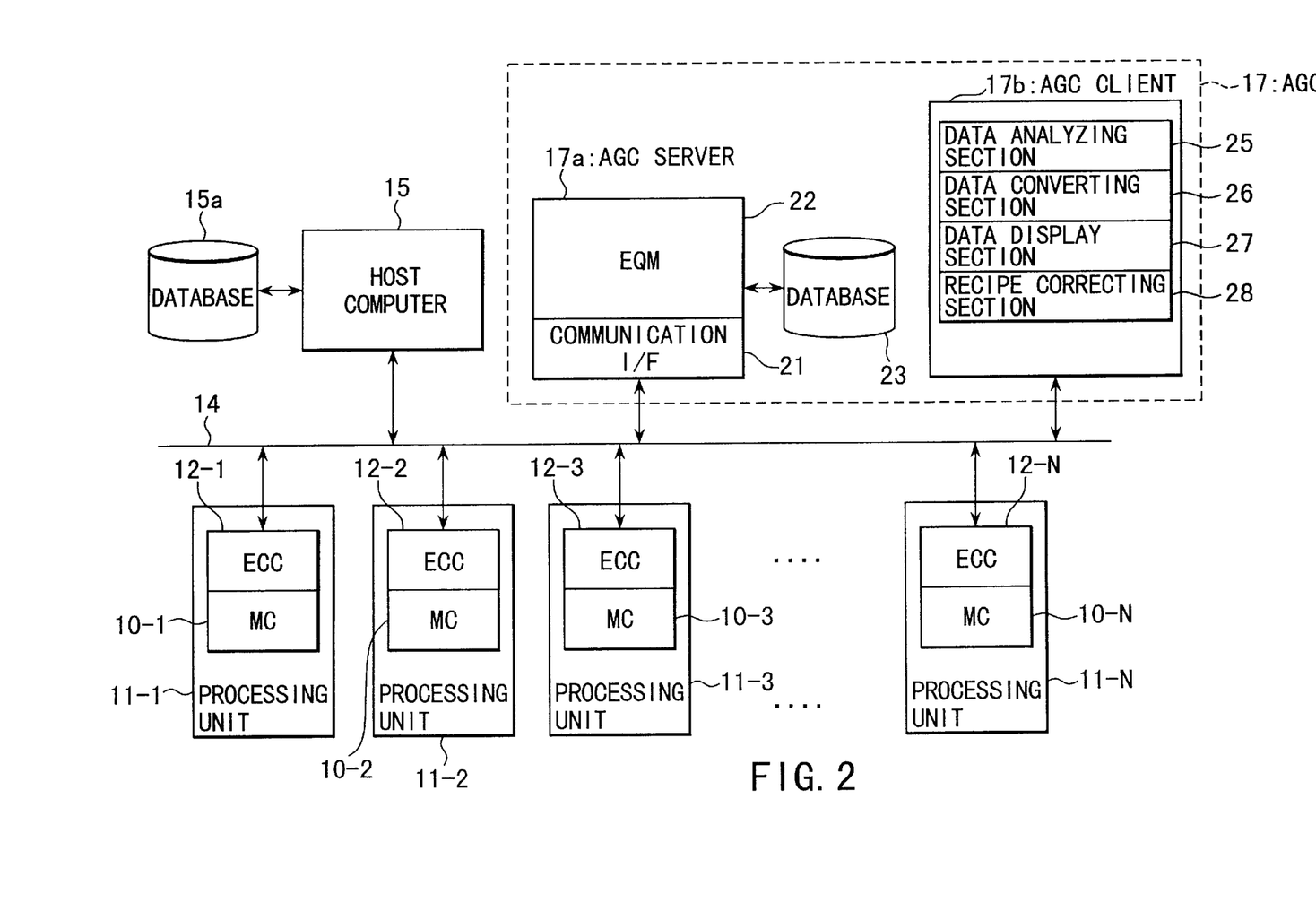
FIG. 2 is a block diagram of a control system as a first mode of implementation of the present invention.

According to a control system shown in FIG. 2, processing units 11 (11-1 to 11-N) perform various types of processing to a substrate such as, for example, a CVD processing, a sputtering processing, an etching processing or a thermal oxide processing, ECC controllers 12 (12-1 to 12-N) are master controllers of the respective processing units 11, and MC controllers 10 (10-1 to 10-N) are slave controllers of the respective processing units 11.

Figure 3:
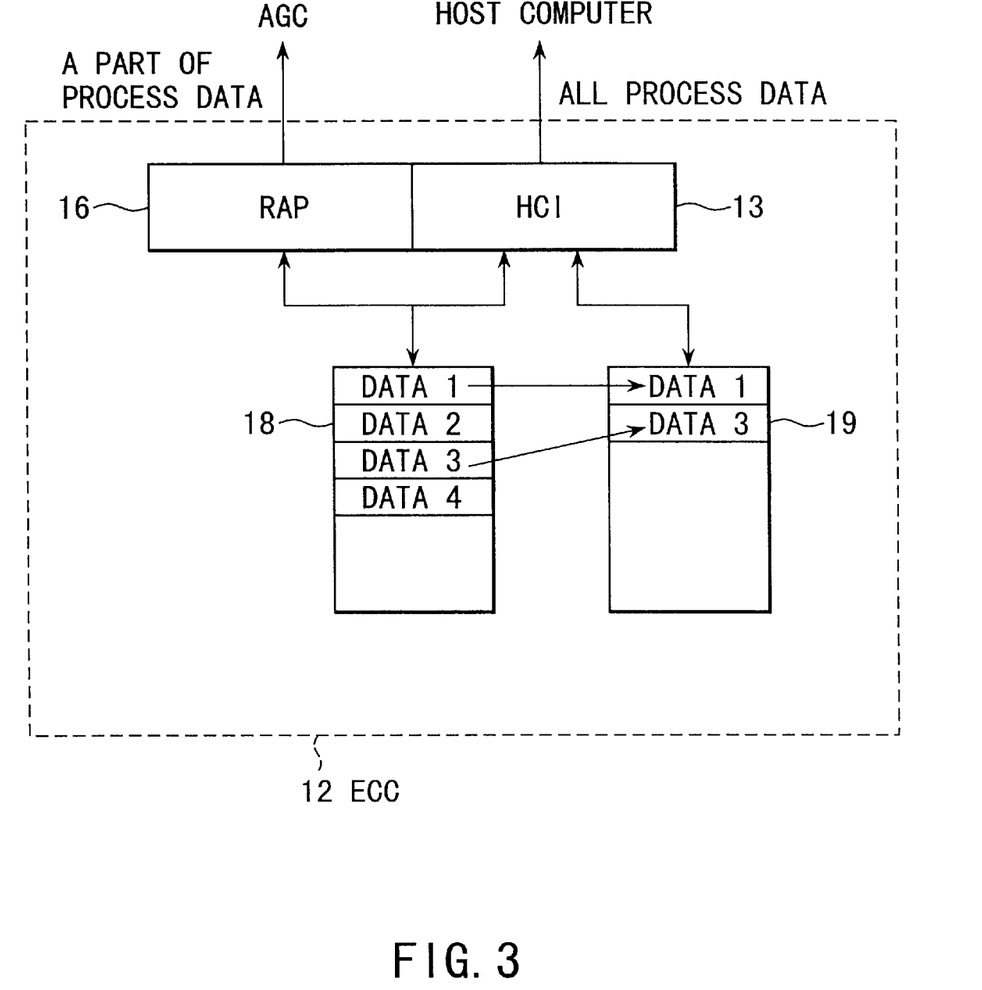
FIG. 3 is a block diagram of an ECC controller of FIG. 2.

As shown in FIG. 3, each ECC controller 12 has an HCI (Host Communication Interface) 13 as logical interface with the host computer 15, and various data transactions with the host computer 15 are carried out by this HCI 13 through a data transmission line 14 such as a TCP/IP. Further, each ECC controller 12 has a RAP (Remote Agent Process) 16 as logical interface with an advanced group controller (to be referred to as AGC hereinafter) 17, and various data transactions with the AGC 17 are carried out by this RAP 16 through the data transmission system 14.

Difference between the function of the HCI 13 and the function of the RAP 16 relating to the process data transfer will be explained below.

The HCI 13 selects only a preset kind of process data from among all the process data obtained from the processing unit 11 in the ECC controller 12, and transmits this data to the host computer 15. In other words, in FIG. 3, a memory 18 temporality stores all the process data generated by the ECC controller 12, the HCI 13 takes out a preset kind of process data (data 1 and 3) from the memory 18, writes the data in an HCI transmission buffer 19 and collectively transmits the contents of the HCI transmission buffer 19 to the host computer 15. Further, the HCI 13 also transmits status data generated in the ECC controller 12 to the host computer 15.

The RAP 16 unconditionally transmits to the AGC 17 all the process data obtained from the processing unit 11 in the ECC controller 12. In other words, the RAP 16 sequentially reads from the header the process data stored in the process data storage memory within the ECC controller 12, and transfers the data in this data structure to the AGC 17. However, in this case, it is possible to rearrange the sequence of the data or to exclude only a minor part of the data.

The host computer 15 performs an overall operation control of each processing unit 11 such as a tracking processing of each processing unit 11 through transactions of various data with the ECC controller 12 of each processing unit 11.

The AGC 17 performs an integrated management of recipes (process condition values) of each processing unit, a process control of each processing unit 11 based on the recipes, an analysis processing and a statistical processing of all the process data obtained from each processing unit, an integrated monitoring processing of the process data and analysis/statistical results, and a process of reflecting the analysis/statistical results to the recipes.

The AGC 17 is structured by an AGC server 17a and an AGC client 17b. A communication I/F (interface section) 21 of the AGC server 17a transmits and receives various data between the ECC controller 12 of each processing unit 11 and the AGC client 17b through the data transmission system 14. An EQM controller 22 mainly performs a correction of various parameters of a process for each processing unit based on predefined process conditions and process data obtained from each processing unit 11, a storing of received parameters in a data base 23, and a searching of process data to be transferred to the AGC client 17b from the data base 23.

The AGC client 17b has functions of a data analyzing section 25 for performing an analysis processing and a statistical processing of process data transferred from the AGC server 17a, a data converting section 26 for converting read process data and analysis results of the process data into data of a format which client users can utilize and process, a data display section 27 for displaying converted data in a monitor or the like, and a recipe correcting section 28 for updating the recipes so as to optimize the recipes (process conditions) based on results of analysis of the process data including measured data such as a film thickness data on a substrate processed.

The operation of this system, mainly the operation relating to the AGC, will be explained below.

At first, the ECC controller 12 of each processing unit 11 controls the corresponding processing unit 11 under the process control of the AGC 17 to make the processing unit execute the processing of a substrate to be processed.

Process data obtained from the processing unit 11 by each ECC controller 12 is written in the process data storage memory 18 shown in FIG. 3. The process data written in the process data storage memory 18 is transferred to the host computer 15 and the AGC 17 through an independent channel of the data transmission system 14 such as the TCP/IP by the HCI 13 as logical interface relating to an external transfer of the process data and the RAP 16.

In this case, the HCI 13 extracts only a preset kind of process data from among all the process data held in the process data storage memory 18, writes this data in the HCI transmission buffer 19, and transmits the content of the HCI transmission buffer 19 to the host computer 15 through the data transmission system 14. On the other hand, the RAP 16 reads out all the process data from the process data storage memory 18 and transfers the read data to the AGC 17.

The AGC 17 (AGC server 17a) receives the process data transmitted by the RAP 16 of the ECC controller 12 of each processing unit, stores this process data in the data base 23, generates parameter corrected values of each processing unit from this process data and the recipe data, and transmits the parameter corrected values to the ECC controller 12 for carrying out the process control.

Further, upon receiving a request for a transfer of process data from the AGC client 17b, the AGC server 17a reads out the corresponding process data from the data base 23 and transmits the read data to the AGC client 17b through the communication I/F 21. The process data transferred to the AGC client 17b is converted by the data converting section 26 into data of a format that can be utilized and processed by the client user and is displayed in the monitor by the data display section 27. Further, the process data transferred to the AGC client 17b is analyzed and statistically processed by the data analyzing section 25. The result of the analysis is converted by the data converting section 26 into data of a format that can be utilized by the user in a similar manner applied to the process data and is displayed in the monitor. Thus, an integral management of the whole substrate processing system on the AGC client 17b can be achieved.

The data analyzing section 25 of the AGC client 17b performs a detection of abnormalities and a prediction of abnormalities of the processing system from the result of the analysis of the process data. When an abnormal condition has been detected or predicted, the data analyzing section 25 outputs this effect to the monitor through the data display section 27 and posts this to the AGC server 17a as well. In accordance with this post, the AGC server 17a performs a control of the ECC controller 12 by instructing it to stop the ECC controller controlled processing unit 11 in which an abnormal condition has been detected or an abnormal condition has been predicted, for example.

Further, the recipe correcting section 28 of the AGC client 17b performs a correction processing for optimizing the recipes (process conditions) from the result of the analysis of the process data including measured data such as a result of a measurement of film thickness on the substrate.

In the present mode of implementation, when the host computer 15 is down, the AGC 17 performs a spooling of the process data. In other words, immediately after the recovery, the host computer 15 can take in the process data during the down period from the AGC 17. This enables the host computer 15 to start the tracking processing of each processing unit 11 immediately after the recovery.

Figure 5:
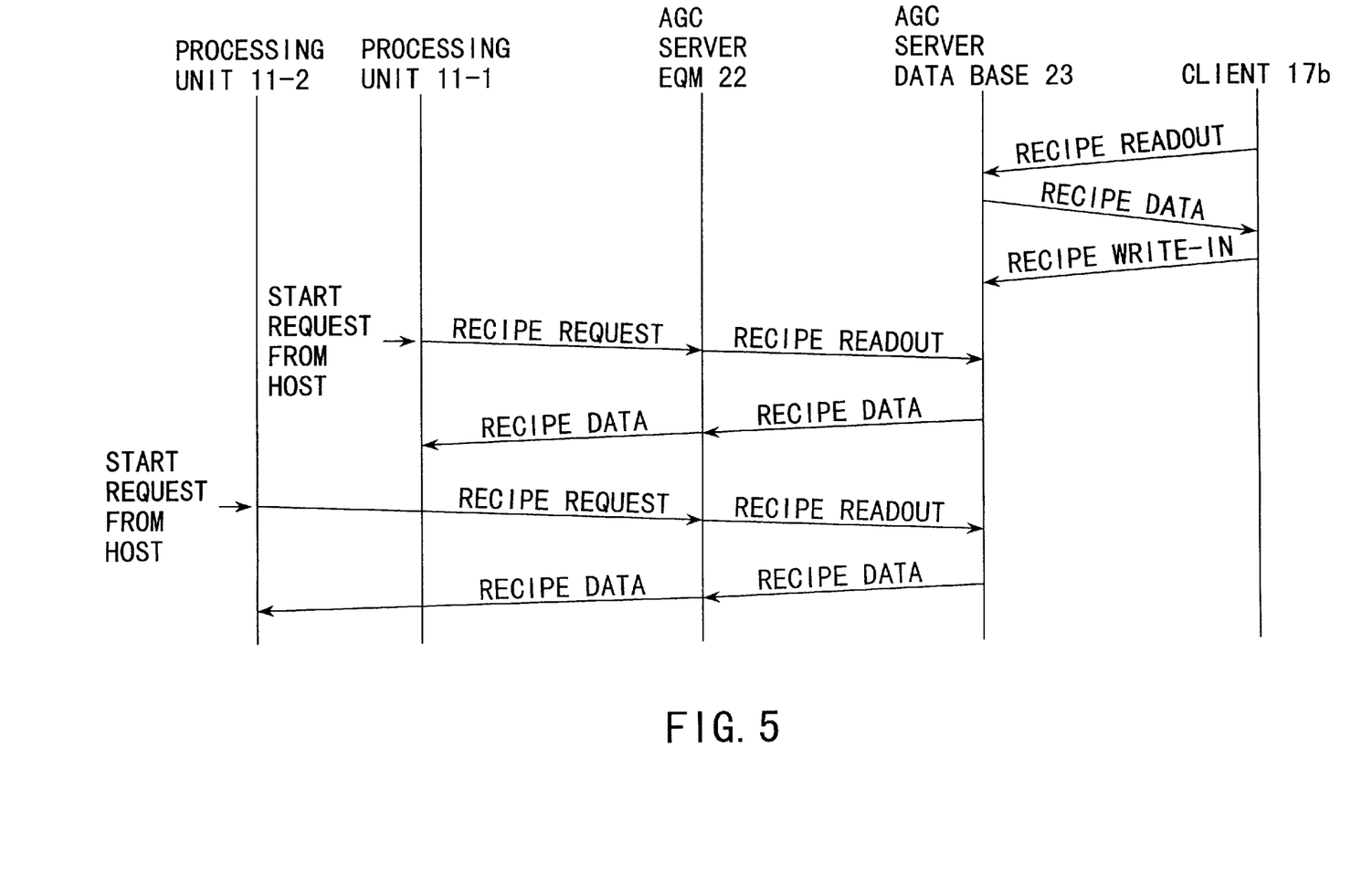
FIG. 5 is a diagram for explaining a recipe edit processing.

Next, the operation for executing the processing by editing the recipe data in the control system will be explained with reference to FIG. 5.

First, the AGC client 17b reads the recipe data from the database 23 through the AGC server 17a. When the recipe data read from the database 23 has been sent to the client 17b, the client 17b edits the recipe data. After finishing the edit processing, the client 17b writes the edited data in the data base 23. Thus, the recipe data in the database 23 is updated.

On the other hand, when the host computer 15 has dispatched a processing starting instruction, for example, recipe ID information corresponding to the process to the processing unit 11-1, the ECC controller 12-1 of the processing unit 11-1 requests the EQM22 of the AGC server 17a for the recipe data. To this request, the AGC server 17a reads out the recipe data from the data base 23 of the AGC server and transfers the read recipe data to the ECC controller 12-1 of the processing unit 11-1. The processing unit 11-1 executes predetermined processes in accordance with the recipe data received. In this case, the ECC controller 12-1 of the processing unit 11-1 stores the actual process data generated during the execution of the processing.

Further, the recipe data transferred to the ECC controller 12-1 of the processing unit 11-1 can be copied to other processing units. These other processing units, such as the processing units 11-2 and 11-3, for example, can execute the processing in accordance with the same recipe data of the processing unit 11-1 in accordance with the copied recipe data. Accordingly, the processing units 11-1, 11-2, and 11-3 can be integrally managed by the AGC server 17a.

Figure 6:
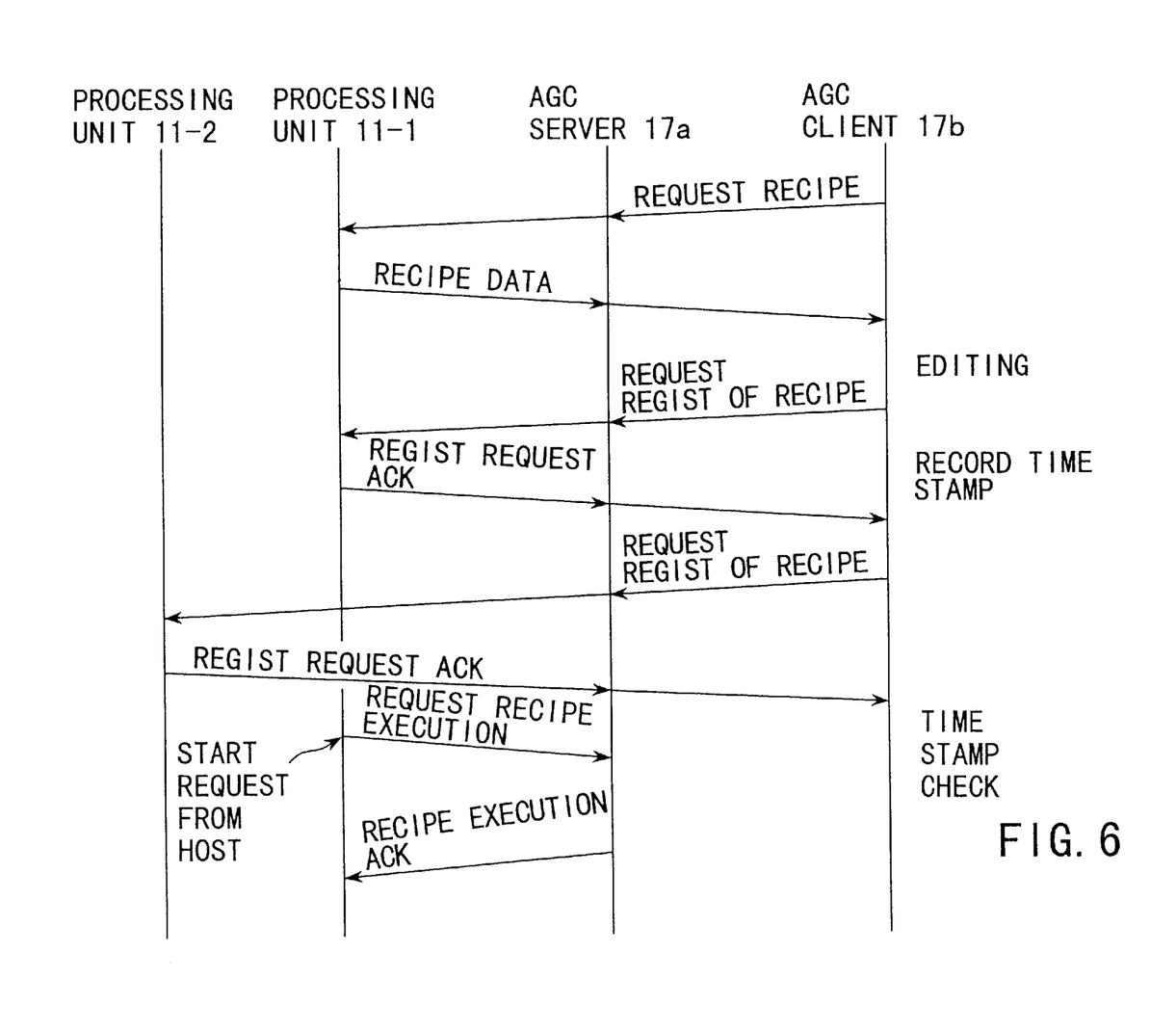
FIG. 6 is a diagram for explaining other recipe edit processing.

While in the above-described embodiment, the processing is carried out in accordance with the recipe data stored in the data base 23, the operation of the control system in a mode of implementation not using the data base 23 will be explained below with reference to FIG. 6.

In this mode of implementation, the AGC client 17b makes a recipe request to the ECC controller 12-1 of the processing unit 11-1, for example, through the AGC server 17a. The ECC controller 12-1 transfers the stored recipe data to the client 17b through the AGC server 17a in accordance with the request. The client 17b having received the recipe data performs the edit processing to the recipe data. After finishing the editing of the recipe data, the client 17b dispatches a request for registration of the recipe data to the ECC controller 12-1 of the processing unit 11-1 through the AGC server 17a. When the ECC controller 12-1 has dispatched an ACK (Acknowledge) to the request for registration, the AGC server 17a registers the recipe data and the AGC client 17b records a time stamp.

Next, a request for registration is dispatched to the ECC controller 12-2 in order to copy the same edit recipe data to other ECC controller 12-2 of the processing unit 11-2. Upon receiving this registration request, the ECC controller 12-2 dispatches an ACK (Acknowledge) and the AGC server 17a registers the recipe data.

When the host computer 15 has sent an instruction for the execution of the processing to the processing unit 11-1, for example, after editing the recipe data as described above, the ECC controller 12-1 of the processing unit 11-1 dispatches a request for an approval of the recipe execution to the AGC server 17a and the AGC client 17b. The AGC server 17a sends an execution approval ACK to the ECC controller 12-1. The AGC client 17b checks the time stamp. Thus, the processing unit 11-1 executes the processing in accordance with the recipe data. The actual data generated by this execution of the processing is stored sequentially in the ECC controller 12-1.

As explained above, according to the control system of the present mode of implementation, all or almost all of the detailed process data obtained from each processing unit can be monitored integrally by reading the data in the AGC 17. Thus, the width of information obtainable as a status of each processing unit can be expanded and the status of abnormal or deterioration conditions of the processing unit can be detected in further detail at an early stage. Further, as all or almost all of the detailed process data obtained from each processing unit can be analyzed and the result of the analysis can be monitored integrally, a secular change of the status of each processing unit can be detected at an early stage. With the above arrangement, it becomes possible to increase the maintenance reliability of the manufacturing system consisting of a large number of processing units. Further, according to the present mode of implementation, it becomes possible to automatically obtain optimum processing conditions from various viewpoints taking secular changes of characteristics of each processing unit into consideration, through the updating of each data of recipes to a more preferable value from the result of analysis and the statistical result of detailed process data including measured data on the substrate such as a measured result of a film thickness.

Further, as the hardware of the AGC 17 is divided into the AGC server 17a for collecting process data and the AGC client 17b for actually utilizing the process data, the control load of each of the divided units is dispersed and the performance is not lowered in the structure having a larger number of processing units connected.

Figure 4:
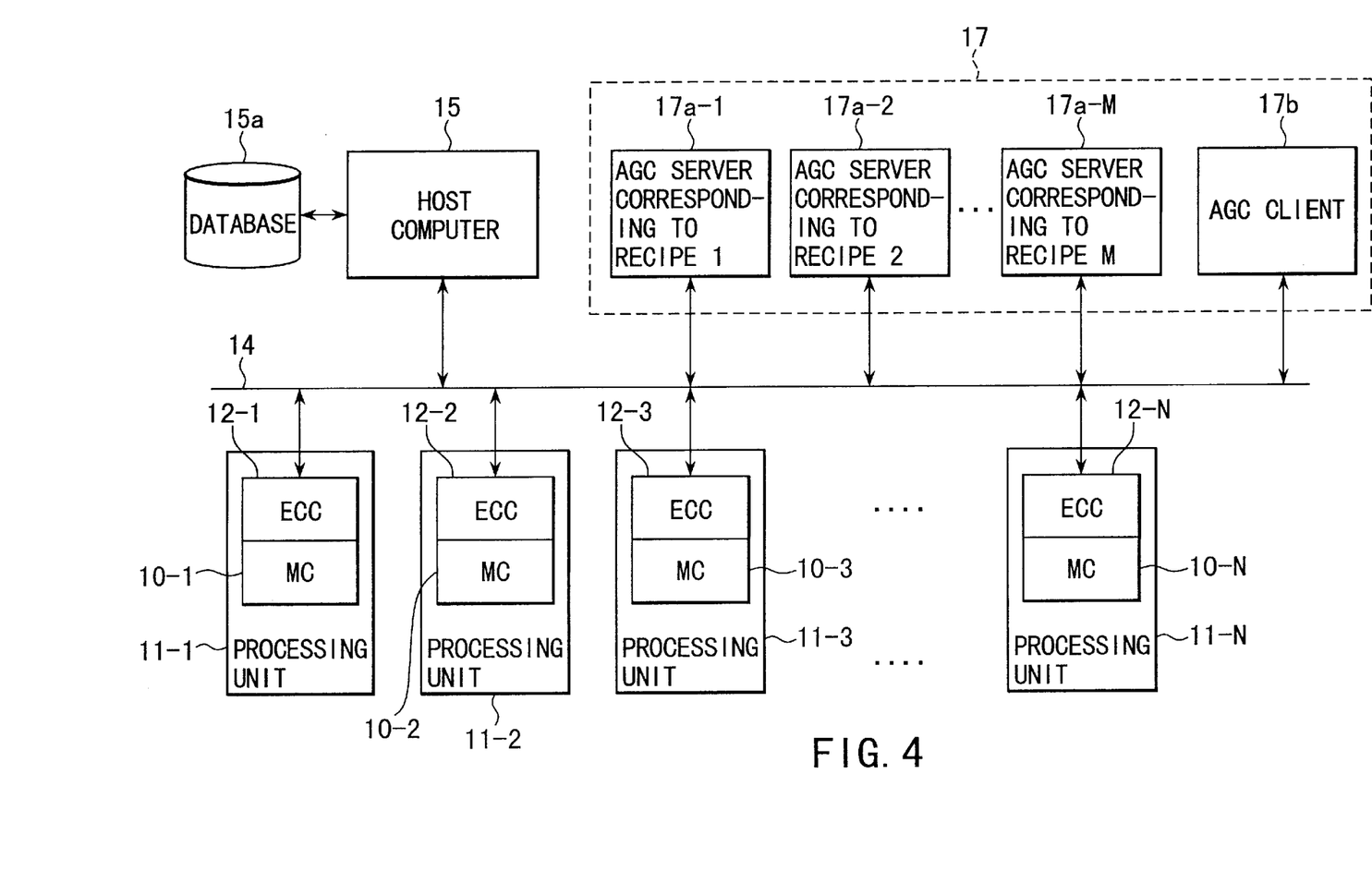
FIG. 4 is a block diagram of a control system as a second mode of implementation.

Although the AGC 17 is structured by one AGC server 17a and one AGC client 17b in the above-explained mode of implementation, it is anticipated that the load of the AGC server 17a becomes very large when the number of processing units connected is increased further. To cope with this situation, there is considered a system of a style having the AGC server 17a (17a-1 to 17a-M) provided by function, for example, by type of recipe, as shown in FIG. 4. When this style is employed, it becomes unnecessary to stop the operation of the group of processing units under the management of other AGC servers at the time of revising the version of individual AGC server functions or at the time of carrying out maintenance inspections, with a resultant increased processing efficiency of the system as a whole.

Further, according to the control system of the present invention, it becomes possible to integrally monitor a further detailed process data as compared with the conventional system for integrally monitoring the process data in the host computer. Thus, abnormal conditions or characteristic deterioration of the processing units can be detected at an early stage. Further, as the hardware of the control unit for collecting and displaying the process data is divided into the server unit and the client unit to disperse the control load of collecting and displaying the process data, the number of connectable processing units can be increased.

Further, according to the control system of the present invention, as the server unit for storing the process data is provided for each predetermined group of the processing units, for example, for each group of processing units to which the same process conditions are set in advance, it becomes possible to further increase the number of processing units that can be connected. It also becomes unnecessary to stop the operation of the group of processing units under the management of other servers at the time of revising the version of the functions of individual server units or carrying out maintenance inspections.

As explained above, according to the control system of the present invention, as the control unit analyzes all the process data generated by the control unit of each processing unit and outputs the result of the analysis, the width of information obtainable as the status of each processing unit can be increased and secular changes of the status of each processing unit can be detected at an early stage as compared with the conventional system for integrally monitoring a part of the process data on the host computer.

Moreover, as the means is further provided for updating the process conditions based on the analysis data of all the process data generated by each control unit, it becomes possible to obtain automatically optimum process conditions from various viewpoints taking account of secular changes of characteristics of each processing unit, avoiding the need for artificial trials and errors for setting process conditions.

Furthermore, according to the control system of the present invention, as the means is further provided for compensating the process data dropped during a period when the host computer cannot receive the process data with the process data collected by the control unit, the host computer can start again the control of the control unit of each processing unit immediately after the recovery from the down status.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control system, comprising:
a plurality of controller units for individually controlling a plurality of processing units for carrying out predetermined processes to a substrate; and
a control unit including a server unit having a storing section for storing the process data generated by each of the controller units, and a client unit having an editing section for reading the stored process data from the server unit and editing the process data, and a display section for displaying the edited data obtained by said editing section.

2. A control system according to claim 1, wherein each of said controller units controls the corresponding processing unit in response to a command from the host computer.

3. A control system according to claim 1, wherein the client unit includes a data analyzing section for performing an analysis processing and a statistical processing of the process data, a data converting section for converting the read process data and a result of the analysis into data of a format capable of being utilized and processed by a user, a display section for displaying the converted data, and a recipe correcting section for updating the recipe to an optimum value based on the result of the analysis of the process data including measured data on the processed substrate including a film thickness.

4. A control system according to claim 1, wherein each of the controller units has a control section for controlling the processing unit upon receiving a command from the host computer, selecting predetermined process data from among all the process data obtained from the processing unit, and transmitting the selected data to the host computer.

5. A control system according to claim 4, wherein the control section has a memory for storing all the process data, a buffer for storing the preset process data taken out from the memory, an interface for transmitting the content of the buffer to the host computer, and an interface for transmitting all the process data of the memory to the control unit.

6. A control system according to claim 1, wherein the server unit corrects various parameters of the process of each processing unit based on predefined process conditions and the process data obtained from each of the processing units, stores received parameters in the storing section, and searches process data to be transferred to the client unit from the storing section.

7. A control system, comprising:
a plurality of controller units divided into a plurality of groups and for individually controlling a plurality of processing units for carrying out predetermined processes to a substrate in relation to a host computer; and
a control unit including a plurality of server units each provided corresponding to each predetermined group of the processing units and having a storage section for reading and storing all the process data generated by each of the controller units, and a client unit having an editing section for reading the stored process data from the server unit and editing the process data, and a display section for displaying the edited data.

8. A control system according to claim 7, wherein the client unit includes a data analyzing section for performing an analysis processing and a statistical processing of the process data, a data converting section for converting the read process data and a result of the analysis into data of a format capable of being utilized and processed by a user, a display section for displaying the converted data, and a recipe correcting section for updating the recipe to an optimum value based on the result of the analysis of the process data including measured data on the processed substrate including a film thickness.

9. A control system according to claim 7, wherein each of the controller units has a control section for controlling the processing unit upon receiving a command from the host computer, selecting predetermined process data from among all the process data obtained from the processing unit, and transmitting the selected data to the host computer.

10. A control system according to claim 9, wherein the control section has a memory for storing all the process data, a buffer for storing preset process data taken out from the memory, an interface for collectively transmitting the content of the buffer to the host computer, and an interface for transmitting all the process data of the memory to the control unit.

11. A control system according to claim 7, wherein the server unit corrects various parameters of the process of each of the processing units based on predefined process conditions and the process data obtained from each of the processing units, stores received parameters in the storing section, and searches process data to be transferred to the client unit from the storing section.

12. A control system according to claim 7, wherein the client unit has a function of copying the same recipe to the control unit corresponding to the processing unit within the same group.

13. A control system, comprising:

a plurality of controller units divided into a plurality of groups including a plurality of processing units each being set at the same process conditions and for individually controlling the plurality of processing units for carrying out predetermined processes to a substrate in association with a host computer; and a control unit including a client unit provided corresponding to each group and having means for reading and editing process data and means for displaying converted data.

14. A control system, comprising:

a plurality of controller units for individually controlling a plurality of processing units for carrying out predetermined processes to a substrate;

a host computer for controlling the controller units based on process data generated by each of the controller units; and a control unit including a plurality of server units each provided corresponding to each group of the processing units to which the same process conditions are set and having means for reading and storing the process data generated by each of the controller units, a client unit for reading the stored process data from the server units and editing the process data and a client unit having means for displaying the edited data.

15. A control system, comprising:

a plurality of controller units for individually controlling a plurality of processing units for carrying out predetermined processes to a substrate;

a host computer for controlling each of the controller units based on process data received from each of the controller units; and a control unit having means for collecting the process data received from each of the controller units, means for analyzing the collected process data and means for outputting a result of the analysis, wherein each of the controller units has means for generating process data, means for transmitting a preset part of the process data from among the generated process data to the host computer and means for transmitting the generated process data to the control unit.

16. A control system according to claim 15, wherein the control unit has means for compensating process data dropped by the host computer during a period while the host computer cannot receive data with the collected process data.

17. A control system, comprising:

a plurality of controller units for individually controlling a plurality of processing units for carrying out predetermined processes to a substrate;

a host computer for controlling each of the controller units based on process data received from each of the controller units; and a control unit having means for collecting the process data received from each of the controller units, means for analyzing the collected process data and means for updating process conditions of each processing unit based on a result of the analysis, wherein each of the controller units has means for generating process data, means for transmitting a preset part of the process data from among the generated process data to the host computer and means for transmitting all the generated process data to the control unit.

18. A control system according to claim 17, wherein the control unit has means for compensating process data dropped by the host computer during a period while the host computer cannot receive data with the collected process data.

* * * * *

UNITED STATES PATENT AND TRADEMARK OFFICE
CERTIFICATE OF CORRECTION

PATENT NO. : 6,269,279 B1
DATED : July 31, 2001
INVENTOR(S) : Todate et al.

It is certified that error appears in the above-identified patent and that said Letters Patent is hereby corrected as shown below:

<u>Title page, Item [54], and Column 1, line 1,</u>
The title should be:
-- [54] A CONTROL SYSTEM FOR SUBSTRATE PROCESSING INCLUDING SERVER UNITS, CLIENT UNITS AND DISPLAY SECTION --
Item [75], the inventors information should be:
-- [75] Inventors: Shigenori Todate, Hino-shi; Katsuhiko Matsuda, Tama-shi; Kazuhisa Nakama, Hachioji-shi, all of (JP) --

Signed and Sealed this

Second Day of April, 2002

*Attest:*

*Attesting Officer*

JAMES E. ROGAN
*Director of the United States Patent and Trademark Office*